(No Model.)
J. B. DEEDS.
HYDROCARBON GENERATOR AND BURNER.
No. 342,189. Patented May 18, 1886.
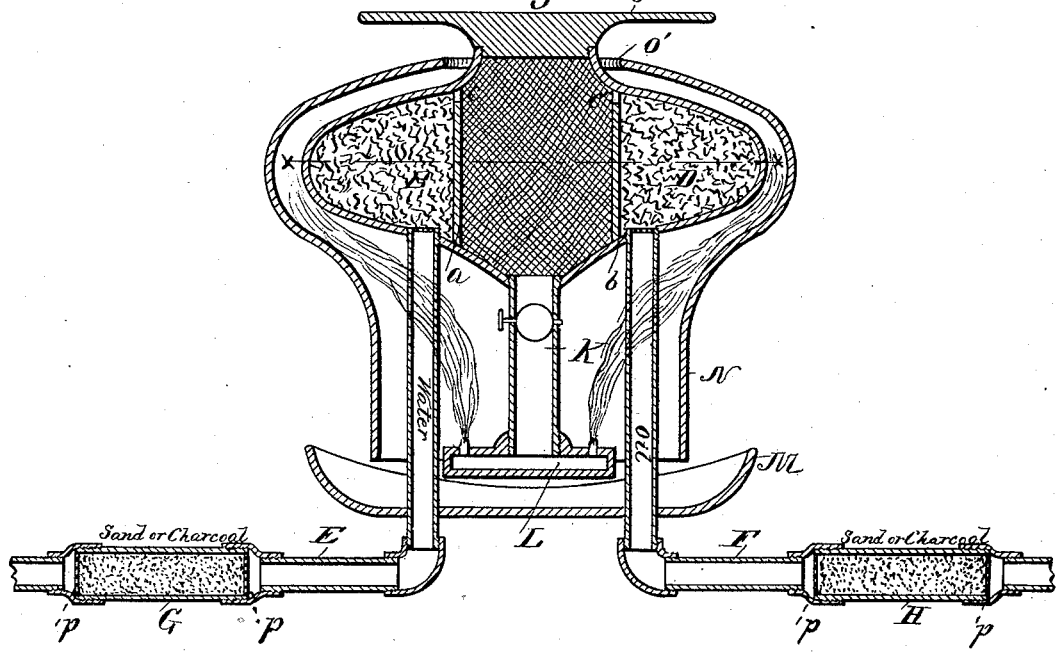
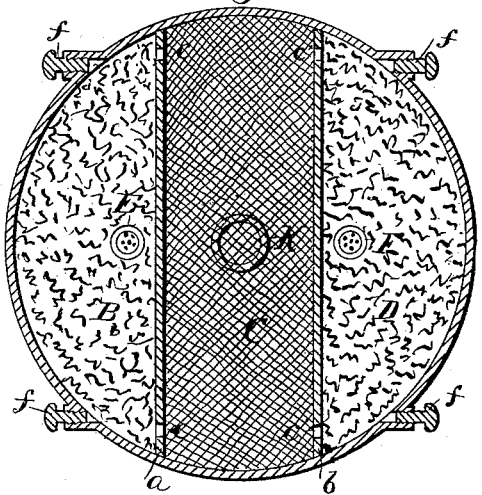
Witnesses.
Wm Rheem,
Alex McClelland.
John B. Deeds
Inventor.
By
E. Everett Ellis
Atty.

UNITED STATES PATENT OFFICE.

JOHN B. DEEDS, OF TERRE HAUTE, INDIANA, ASSIGNOR OF ONE-HALF TO LOUIS S. CALDER, OF SAME PLACE.

HYDROCARBON GENERATOR AND BURNER.

SPECIFICATION forming part of Letters Patent No. 342,189, dated May 18, 1886.

Application filed February 9, 1886. Serial No. 191,309. (No model.)

*To all whom it may concern:*

Be it known that I, JOHN B. DEEDS, a citizen of the United States, residing at Terre Haute, in the county of Vigo and State of Indiana, have invented certain new and useful Improvements in Hydrocarbon Generators and Burners; and I do hereby declare the following to be a full, clear, and exact description of the invention, such as will enable others skilled in the art to which it appertains to make and use the same.

The object of my invention is to produce a hydrocarbon burner or heater that will neither leak nor make the disagreeable odors that is a damaging characteristic of all other burners of which I have any knowledge, while at the same time there is a combustion of every particle of gas, a greater intensity of heat, and a superior quality of gas for illuminating or heating purposes resulting from its action than obtains in the use of many other burners heretofore employed.

The nature of my invention consists in providing an apparatus to burn the gas produced by the vaporization of petroleum or other volatile fluids and water. To accomplish these important ends, I combine mechanical agencies in a novel arrangement which is so ordered that each part co-operates with all the others to produce the desired objects.

My invention will be better understood by referring to the drawings, of which Figure 1 is a vertical sectional view; and Fig. 2 is a horizontal sectional view of the vaporizing and mixing chambers, taken in the line $x\,x$ of Fig. 1.

In my apparatus each of the longitudinal vaporizing-chambers of the heater or vaporizer is filled with iron filings, by which the fluid is more thinly disseminated and its vaporization more readily effected, also serving to heat such fluid to better advantage than heretofore.

My invention also relates to the arrangement of induction and eduction pipes with respect to the burner or heater, whereby they become exposed to the blaze and heat of the burner, and as a consequence not only is the water vaporized to better advantage and the steam superheated, but the petroleum or fluid to be converted into gas is also better heated and vaporized.

This apparatus can be practically adapted to hot-air furnaces, stoves for cooking and heating purposes, and also for producing heat to generate steam for power or heating purposes; also, is of great importance for the production of illuminating-gas.

In the drawings, A denotes a hollow elliptical or other formed vessel, heater, or retort, made of the strongest metal or material, and divided lengthwise by two partitions, $a\,b$, into three distinct chambers, B C D, of which B and D are filled with iron filings, and C with wire-gauze, the better to disseminate and decompose the fluids being vaporized.

$c\,c'$ designate openings in the partition-walls $a\,b$, whereby communication is established between the chambers B, D, and C. Of these chambers B is the oil-vaporizing chamber; D, the water-vaporizing chamber, and C the mixing and superheating chamber, wherein the vapors generated in chambers B D are mixed, superheated, and fixed before being utilized for heating or illuminating purposes. The openings $c\,c'$ are shown located at the upper edge of the partition-plates. While this is preferable for establishing a communication to the mixing-chamber, whereby the vapor can readily escape from the vaporizing-chambers, it will be understood that my invention is not limited to this particular means, since communication may be had between the vaporizing-chambers and the mixing-chamber by means of small pipes extending outside of the retort, &c.

Conduits or pipes E F, to convey oil and water, lead into the vaporizing-chambers from beneath. Connected to the pipes E F by tight screw-joints are pipes G H, filled with charcoal or other carbonaceous substance, or a silicious material, such as sand. At each end of the pipes G H are removable wire lattice or perforated thin plate diaphragms $p$, to prevent the escape of the charcoal or sand. The oil, in passing through the charcoal in pipe G, is carbureted to a greater or less degree, and hence the illuminating properties of the gas that is evolved from it are improved in a corresponding ratio. In fact, the chemical action of the charcoal, when the oil comes into contact with it, is to produce a slight evolution of gas from the latter, which to some extent is charged with carbon spirit, and is therefore superior as an illuminating-gas to the gas that is produced simply by the oil.

It will be understood that the pipes for supplying the oil and water are provided with the usual index-valves, to register the flow of fluid and valves for turning on and off the flow of fluid. These are so well known in this class of inventions that further description is unnecessary.

To the lower and central portion of the vapor-mixing chamber is attached the pipe K and burner L, by which the gas and heated vapor are conveyed under the retort A for consumption. The gases generated passing through the pipe K are led immediately and directly under the center of the retort A, where they are discharged through the burner L. The gases may be controlled by a valve located in the pipe K, which also serves to extinguish the light from the burner and prevent the escape of gas left in the pipe K and chamber C after the supply of oil has been turned off, which gas, if it escaped, would produce unwholesome and unpleasant odors.

Beneath the burner L is a pan, M, into which oil is poured and ignited when first starting the retort, and kept up until a sufficient quantity of the fluid has been vaporized to supply the burner with gas from the mixing-chamber.

N is a shield or hood, the object of which is to confine the flame and direct the same toward and in contact with the retort, and at the same time allowing sufficient space at the bottom for the admission of air to support combustion and a sufficient space at the top to allow the escape of the flame.

O designates a deflecting-plate, screw-threaded at its under side and fitting into an opening correspondingly screw-threaded on the upper part of the retort, whereby the flame escaping through the opening O' is deflected and the plate readily removed to permit entrance to the mixing-chamber for repairs, the introduction of wire-gauze, &c.

$ff$ designate openings in the chambers B D, whereby said chambers may be filled with the iron filings, borings, &c. These openings may be closed by suitable screw-threaded caps, as shown.

The operation of my invention is as follows: The chambers B and D being filled or partially filled with oil and water, heat is applied to the retort by means of alcoholic or other suitable fluid ignited in the pan M until the vapors generated in the retort flow through the pipe K and begin to issue from the burner L and ignition of the same can be effected. This process will not usually require more than one or two minutes of time. The moment ignition of the escaping gas occurs the flame, in ascending through the central opening, is brought in contact with the supply-pipes and retort, thereby continuing the generating of the vapors of oil and water, which are mingled and mixed in the mixing-chamber and formed into a fixed gas. The escaping flame is deflected outwardly in all directions by means of the deflector, and thus is the flame directed against the retort at all sides.

I am aware that hydrocarbon-vapor generators have been heretofore constructed of a mixing-chamber together with vaporizing-chambers for both the water and oil or steam, as the case may be; but in such former instances they have been constituted, not by a single vessel divided into three separate compartments, but, rather, as an instance, of two pipes or tubes uniting with the ends of a third tube.

I am aware, further, that in this class of inventions a single vessel divided into three compartments has been heretofore employed; but in such instance each of the compartments is used as a vaporizing-chamber, having no communication with each other, my invention being distinguished from those of heretofore in that a single vessel is resorted to, divided into three separate compartments, the outer two of which constitute vaporizing-chambers and the third a central mixing-chamber.

Having thus described my invention, what I claim is—

1. In a hydrocarbon-vapor generator and burner, the combination of the retort divided longitudinally into two outer vaporizing-chambers and a central mixing-chamber, and means for heating the same, substantially as described.

2. The combination of the retort constructed with the central mixing-chamber and two outer vaporizing-chambers communicating with the mixing-chamber, inlet-pipes connecting with each vaporizing-chamber, and a pipe leading from the mixing-chamber to a burner, substantially as described.

3. The combination of the retort constructed with two outer vaporizing-chambers having filling-openings for a material, as iron filings or other suitable material, and a central mixing-chamber filled with wire-gauze, the deflector-plate secured in the top of said latter chamber, and the enveloping hood or shield, all arranged substantially as and for the purpose described.

4. The combination of the retort A, as described, enveloping-shield N, deflector O, inlet-pipes E F, having filtering-connections, as specified, burner L, and pan M, arranged substantially as and for the purpose described.

In testimony whereof I affix my signature in presence of two witnesses.

JOHN B. DEEDS.

Witnesses:
THOMAS I. OGL,
ALPHEUS G. SERIGHT.